United States Patent
Lou et al.

(10) Patent No.: US 9,336,569 B2
(45) Date of Patent: May 10, 2016

(54) IMAGE COMPENSATION METHOD AND APPARATUS

(71) Applicant: Shenyang Neusoft Medical Systems Co., Ltd., Shenyang (CN)

(72) Inventors: Shanshan Lou, Shenyang (CN); Lixia Tong, Shenyang (CN)

(73) Assignee: SHENYANG NEUSOFT MEDICAL SYSTEMS CO., LTD., Shenyang (CN)

( * ) Notice: Subject to any disclaimer, the term of this patent is extended or adjusted under 35 U.S.C. 154(b) by 25 days.

(21) Appl. No.: 14/142,939

(22) Filed: Dec. 30, 2013

(65) Prior Publication Data

US 2015/0030221 A1 Jan. 29, 2015

(30) Foreign Application Priority Data

Jul. 25, 2013 (CN) .......................... 2013 1 0319943

(51) Int. Cl.
*G06K 9/32* (2006.01)
*G06T 3/40* (2006.01)
*G06T 3/00* (2006.01)

(52) U.S. Cl.
CPC .............. *G06T 3/4038* (2013.01); *G06T 3/0068* (2013.01)

(58) Field of Classification Search
None
See application file for complete search history.

(56) References Cited

U.S. PATENT DOCUMENTS

| | | | | |
|---|---|---|---|---|
| 7,822,251 | B2 * | 10/2010 | Ding | A61B 6/032 382/130 |
| 2002/0006217 | A1 | 1/2002 | Rubbert et al. | |
| 2005/0069188 | A1 | 3/2005 | Rubbert et al. | |
| 2008/0317317 | A1 * | 12/2008 | Shekhar | G06T 3/0081 382/131 |
| 2011/0181701 | A1 * | 7/2011 | Varslot | G06T 7/0024 348/46 |

FOREIGN PATENT DOCUMENTS

| | | |
|---|---|---|
| CN | 1818974 A | 8/2006 |
| CN | 101398935 A | 4/2009 |
| CN | 101750430 A | 6/2010 |

OTHER PUBLICATIONS

Mutual Information-Based . . . Volumes, Shekhar et al., IEEE, 0278-0062.*
*Realizing generalized registration of medical sequence image using mutual information criterion*, Zhao Chen-guang, et.,al, Chinese Journal of Medical Physics, vol. 18, No. 1, p. 23-27.
*The Research on Non-rigid Registration of the Medical Image*, Ying, Shen Chinese Master's Theses Full-text Database (CMFD), pp. 6-10, pp. 27-35.
The first Office Action issued on Jul. 22, 2015 regarding the Chinese priority patent application (201310319943.6).

* cited by examiner

*Primary Examiner* — Jayesh A Patel
(74) *Attorney, Agent, or Firm* — Kilpatrick Townsend & Stockton LLP (57) ABSTRACT

A method and apparatus of image compensation are provided. The method may include: calculating an overlapping position between two adjacent scannings; obtaining two images at the overlapping position of the two adjacent scannings, and calculating mutual information of the two images by using a three dimensional non-rigid registration method; and acquiring a corresponding transformational matrix when the mutual information reaches a threshold, and compensating one of the two scans which needs to be compensated by using the transformational matrix. Images at the overlapping position of two neighboring scannings can be used to find a motion law at an identical z position of the two adjacent scannings and to obtain a corresponding match factor. Thus inconsistence of images caused by a patient's movement can be compensated.

12 Claims, 3 Drawing Sheets

IMAGE COMPENSATION METHOD AND APPARATUS

CROSS REFERENCE TO RELATED APPLICATIONS

The present application claims priority to Chinese patent application No. 201310319943.6, filed on Jul. 25, 2013, and entitled "Image Compensation Method and Apparatus", the entire disclosure of which is incorporated herein by reference.

TECHNICAL FIELD

The present disclosure generally relates to medical imaging technology, and more particularly, to an image compensation method and apparatus.

BACKGROUND

X-ray Computed Tomography (CT) system can reconstruct a tomographic scanned image of an object utilizing computer technology, so as to obtain a three-dimensional (3-D) tomographic image. By transmitting a single axial plane radiation through an object under measurement, a computer acquires the penetrated radiation and generates an image by 3-D reconstruction based on the fact that the radiation absorptivity and transmittance by different parts of the object are different.

Currently, multiple scanning modes are exploited by a CT apparatus, where "step-scan" mode is widely used with the increasingly growing requirements of rotational speed, spatial resolution, width of a detector of the apparatus, and radiation dose. As for the step-scan mode, a certain number of Z position overlappings exist during two scanning processes according to specific requirements. In a practical scanning process, intermittent motions of a patient table may cause a patient move (such as cough, breathe or tiny shift), which results in inconsistence of images generated in different scanning processes, thereby affecting images' continuity and in turn adversely influencing medical diagnosis.

SUMMARY

Embodiments of the present disclosure provide an image compensation method and apparatus, so as to solve the problems of inconsistence of images generated in different scanning processes caused by a patient's movement, which thus affects images' continuity and further adversely influences medical diagnosis.

In one embodiment, an image compensation method is provided, which may include:
calculating an overlapping position between two adjacent scannings;
obtaining two images at the overlapping position of the two adjacent scannings, and calculating mutual information of the two images by using a three dimensional non-rigid registration method; and
acquiring a corresponding transformational matrix when the mutual information reaches a threshold, and compensating one of the two images which needs to be compensated by using the transformational matrix.

In some embodiments, calculating an overlapping position between two adjacent scannings may include:
calculating a position range for reconstructing a complete image by using the center of the first scanning as a symmetry point; and
calculating the overlapping range between the two adjacent scannings according to the position range for reconstructing a complete image.

In some embodiments, the step of obtaining two images at the overlapping position of the two adjacent scannings, and calculating mutual information of the two images by using a three dimensional non-rigid registration method may include:
S1, calculating reconstruction fields of view at the overlapping position of the two neighboring scannings and selecting the smaller one;
S2, acquiring two images including a first image and a second image at the overlapping position of the two adjacent scannings according to the smaller reconstruction fields of view;
S3, setting a transformational matrix T equal to a product of a translation, a rotational angle and a scale zoom factor, and predetermining an initial value of the transformational matrix;
S4, performing, by using any one of the two images as a floating image and the other one as a reference image, a coordinate transformation on the floating image with the transformational matrix T;
S5, calculating the mutual information between the reference image and the image after coordinate transformation, and determining whether or not the mutual information reaches a threshold; and
S6, if not, modifying the transformational matrix T using an optimizing search method, and performing a coordinate transformation on the floating image by using the modified transformational matrix T, and then the method going to the step of S5.

In some embodiments, the transformational matrix T may be modified with a Powell optimizing search method when the mutual information does not reach the threshold.

In some embodiments, an initial value of the transformational matrix may be predetermined to be a conjugate unit vector.

In some embodiments, the method may further include performing denoising and/or sampling on the floating image before performing a coordinate transformation on the floating image with the transformation matrix T.

In some embodiments, after performing a coordinate transformation on the floating image with the transformation matrix T, the method may further include performing an interpolation process on the transformed image. In this case, S5 may include: calculating the mutual information between the reference image and the image after being interpolated, and determining whether or not the mutual information reaches a threshold.

In one embodiment, an image compensation apparatus is provided, which may include:
a first calculating device, configured to calculate an overlapping position between two adjacent scannings;
a second calculating device, configured to obtain two images at the overlapping position of the two adjacent scannings, and calculate mutual information of the two images by using a three dimensional non-rigid registration method; and
a first compensating device, configured to acquire a corresponding transformational matrix when the mutual information reaches a threshold, and compensate one of the two images which needs to be compensated by using the transformational matrix.

In some embodiments, the first calculating device may include:
a first position sub-module, configured to calculate a position range for reconstructing a complete image by using the center of the first scanning as a symmetry point; and an overlapping position sub-module, configured to calculate an overlapping range between the two adjacent scannings according to the position range for reconstructing a complete image.

In some embodiments, the second calculating device may include:

an image construction sub-module, configured to calculate reconstruction fields of view at the overlapping position of the two neighboring scannings and select the smaller one;

an acquiring sub-module, configured to acquire the two images including a first image and a second image at the overlapping position of the two adjacent scannings;

an setting sub-module, configured to set a transformational matrix T equal to a product of a translation, a rotational angle and a scale zoom factor, and predetermine an initial value of the transformational matrix;

an transformation sub-module, configured to perform, by using any one of the two images as a floating image and the other image as a reference image, a coordinate transformation on the floating image with the transformational matrix T;

a determination sub-module, configured to calculate mutual information between the reference image and the image after coordinate transformation, and determine whether or not the mutual information reaches a threshold; and a modification sub-module, configured to modify the transformational matrix T by using an optimizing search method, wherein the modified transformational matrix T is sent to the transformation sub-module to perform a coordinate transformation on a floating image with the modified transformational matrix T.

In some embodiments, the modification sub-module may be configured to modify the transformational matrix T with a Powell optimizing search method.

In some embodiments, the setting sub-module may be configured to predetermine an initial value of the transformational matrix to be a conjugate unit vector.

In some embodiments, the second calculating device may further include a preprocess sub-module configured to perform denoising and/or sampling on the floating image before the transformation sub-module performs a coordinate transformation on the floating image.

In some embodiments, the second calculating device may further include an interpolation sub-module configured to, after the transformation sub-module performs a coordinate transformation on the floating image, perform an interpolation process on the transformed image; and the determination sub-module may be configured to the calculate mutual information between the reference image and the image after being interpolated, and determine whether or not the mutual information reaches a threshold.

In conclusion, embodiments of the present disclosure may be implemented by calculating an overlapping position between two adjacent scannings; obtaining two images at the overlapping position of the two adjacent scannings, and calculating mutual information of the two images using a three dimensional non-rigid registration method; and acquiring a corresponding transformational matrix when the mutual information reaches a threshold, and compensate one of the two images which needs to be compensated by using the transformational matrix. Because some z positions are overlapped between the two adjacent scannings, the image at the z position is not a complete image, which however can be used to find a motion law at the z position in the two adjacent scannings and obtain a corresponding match factor. The match factor can be used to compensate for the image, so as to obtain an image having a same motion state matching with the previous scanning. The physiological structure of an object under scanning may be varied in different scannings due to the object's motion, a three dimensional non-rigid registration method is used in embodiments of the present disclosure to perform transformation, so as to achieve consistence of images at the z position. In conclusion, the apparatus provided in embodiments of the present disclosure can solve the problems of inconsistence of images generated in different scannings caused by a patient's movement, which thus affects images' continuity and in turn adversely influences medical diagnosis.

BRIEF DESCRIPTION OF THE DRAWINGS

A further understanding of the nature and advantages of various embodiments may be realized by reference to the following figures. The accompanying drawings are presented for descriptive purpose, but not intended to be limiting. To those skilled in the art, other accompanying drawings may be obtained according to the disclosure without creative work.

DETAILED DESCRIPTION

In order to clarify the objects, characteristics and advantages of the disclosure, the embodiments of the present disclosure will be described in detail in conjunction with the accompanying drawings.

It should be noted that the method provided in the embodiments of present disclosure is suitable for an X-ray CT apparatus. Typically, an X-ray CT apparatus includes a patient table, an operation platform, an X-ray source and a detector. A scanning process may include: first, an object to be scanned being positioned on the patient table; the patient table extending from the operation platform and delivering the object to a scanning plane defined by the X-ray source and the detector; finally, the X-ray source and the detector rotating around the object to acquire scanning data of the object. An image may be constructed based on related scanning data, which may reflect an actual condition of the object being detected.

Embodiment One

Figure 1:
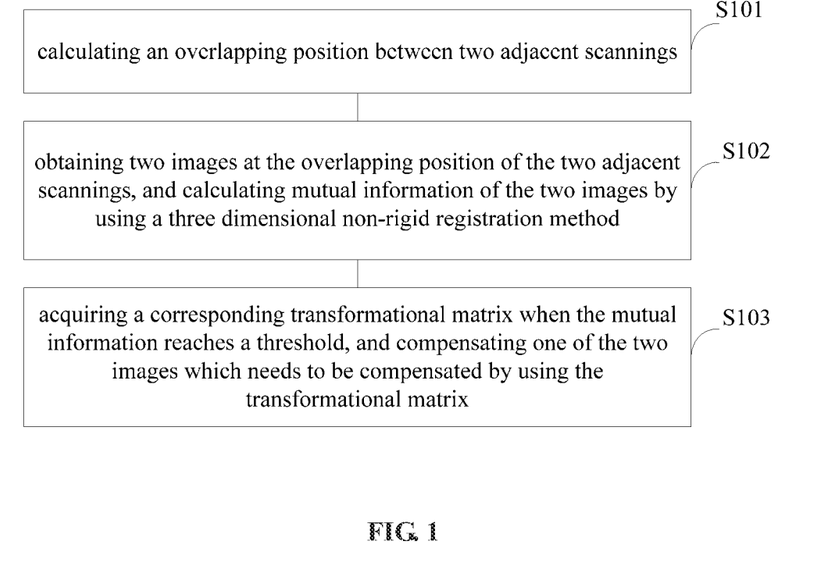
FIG. 1 schematically illustrates a flow chart of an image compensation method according to a first embodiment of the present disclosure.

Referring to FIG. 1, FIG. 1 schematically illustrates a flow chart of an image compensation method according to a first embodiment of the present disclosure. The method may include the steps of S101, S102 and S103.

S101, calculate an overlapping position between two adjacent scannings;

In a CT apparatus, a patient table has a plurality of scale values, Z positions. That is, each table position corresponds to a scale value. For example, if a patient table has a length of 3 m, the patient table may have scale values ranging from 0 cm to 300 cm from beginning to end. The scale values may be used to indicate a position of the patient table where an image is reconstructed. Assuming that 5 images need to be reconstructed of an object, each image may be reconstructed every 1 cm at the scale values from 20 cm to 25 cm. That is, one slice of image is reconstructed at the scale values of 21 cm, 22 cm, 23 cm, 24 cm and 25 cm, respectively, and a total of 5 images can be obtained.

Figure 2:
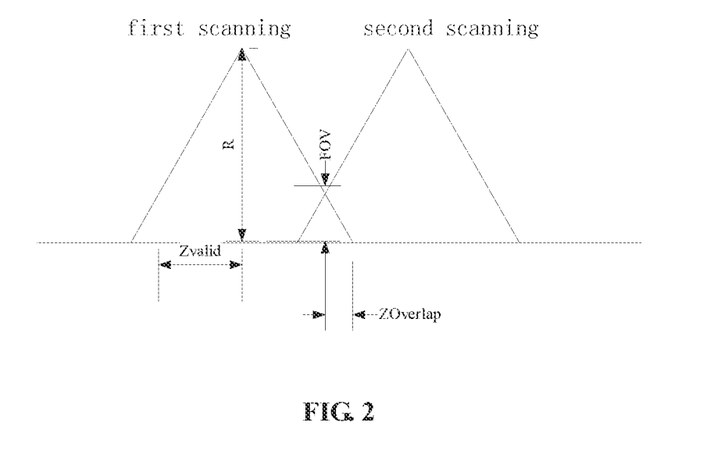
FIG. 2 schematically illustrates an overlapping area between two adjacent scannings according to the first embodiment of the present disclosure.

A "step-scan" mode refers to acquiring scanned data at a first position, and quickly changing to a second position to perform a next scanning. There is an overlapping area between the two adjacent scannings. A mobile distance of each scanning is smaller than a width of a detector, and detectors of CT apparatus of different types have different widths. There are various image reconstruction methods in the conventional art. No matter what kind of image reconstruction method is adopted, an overlapping position can be calculated using the method described below. In embodiments of the present disclosure, the overlapping position is used for image registration, as long as there is an overlapping of two adjacent scannings, the overlapping position can be calculated. And how much or how they are overlapped, are related to a specific image reconstruction method and will not be described in detail here. FIG. 2 schematically illustrates an overlapping area of two adjacent scannings according to the first embodiment of the present disclosure.

Before scanning, a first scanning range needs to be determined and a next scanning range may be calculated according to a required overlapping range. Similarly, the following scanning range may be determined and scannings may be performed in the corresponding scanning ranges.

Specifically, S101 may include steps S101A and S101B.

S101A, calculate a position range for reconstructing a complete image by using the center of the first scanning as a symmetry point.

In some embodiments, a position range for reconstructing a complete image may be calculated according to equation (1):

$$ZValid = \frac{D - FOV}{D} * (M - 1) * 0.5 * S,$$

by using the center of a first scanning as a symmetry point.

In the equation (1), M represents a slice number of a detector, S represents a width of each slice, D represents a distance between a focus and a rotating center, and FOV represents field of view for image reconstruction.

Figure 3:
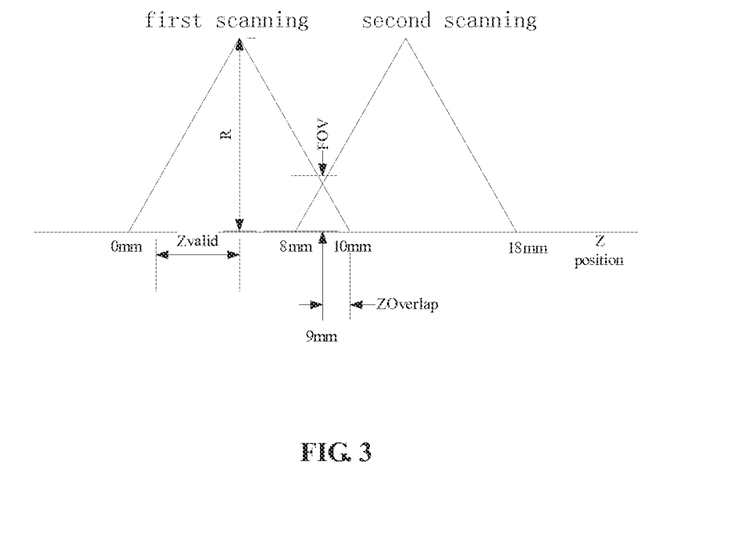
FIG. 3 schematically illustrates a scanning result of the two adjacent scannings according to the first embodiment of the present disclosure.

FIG. 3 schematically illustrates a scanning result of two adjacent scannings according to the first embodiment of the present disclosure. If the first scanning range is from 0 mm to 10 mm, the center of the first scanning is 5 mm. ZValid represents a distance between the center and a position which is used to reconstruct a complete image. For example, if ZValid equals to 4 mm, the position range for reconstructing a complete image is from (5−4)mm to (5+4)mm, that is, 1 mm to 9 mm.

S101B, calculate an overlapping range between two adjacent scannings according to the position range for reconstructing a complete image.

Specifically, an overlapping range between two adjacent scannings may be calculated according to equation (2): ZOverlap=(M−1)*S*0.5−ZValid+a, by using the center of the two adjacent scannings as a symmetry point, or, according to a relationship between the overlapping range and the first scanning position, where a represents an expanded overlapping width which is predetermined and equals to or greater than 0.

In the equation (2), M represents a slice number of a detector, S represents a width of each slice, and ZValid represents a position range which can be used to reconstruct a complete image by using a scanning center as a symmetry point.

Typically, a position range of the first scanning needs to be predetermined before scanning. Then, according to the center a1 of the first scanning, a width S of each slice of the detector, a slice number of a detector M, and ZOverlap calculated according to the equation (2), the center a2 of the second scanning can be calculated based on equation (3): a2=a1+(M*S−2×ZOverlap). The center a2 of the second scanning is related to ZOverlap. Finally, the center of the two adjacent scannings can be calculated as: (a1+a2)/2.

By using the center of the two adjacent scannings as a symmetry point, an overlapping range between the two adjacent scannings may be calculated. Assuming that the position range of the first scanning is from 0 mm to 10 mm, and ZOverlap equals to 1 based on the above-mentioned equations, the center of the two adjacent scannings is calculated to be 9 mm. Thus, an overlapping range between the two adjacent scannings is from (9−1)mm to (9+1)mm, that is, 8 mm to 10 mm.

In some embodiments, an overlapping range between two adjacent scannings may be calculated according to a relationship between the overlapping range and the first scanning position. Assuming that the position range of the first scanning is from 0 mm to 10 mm, and ZOverlap equals to 1, the start position of the overlapping range may be calculated by subtract twice ZOverlap from the ending position of the first scanning, which may be expressed as 10 mm−2*1 mm=8 mm. The ending position of the overlapping range equals to the ending position of the first scanning 10 mm. That is, the overlapping range is from 8 mm to 10 mm.

By predetermining an expanded overlapping width a, the overlapping range can be expanded, so that the image registration which is based on the image constructed at the overlapping position is more accurate.

S102, obtain two images at the overlapping position of the two adjacent scannings, and calculate mutual information of the two images by using a three dimensional non-rigid registration method.

Specifically, S102 may include S1 to S6.

S1, calculate reconstruction fields of view at the overlapping position of the two neighboring scannings and select the smaller one, and perform two times scanning to construct two images at the overlapping position.

Specifically, S1 can be performed according to equation (3):

$$FOV(z) = \left(1 - \frac{z}{0.5 * (M - 1) * S}\right) * D * 2,$$

where z represents a coordinate distance between a scanning position and a scanning center.

In the equation (3), M represents a slice number of a detector, S represents a width of each slice, D represents a distance between a focus and a rotating center, and z represents a coordinate distance between a scanning position and a scanning center.

Referring to FIG. 3, the overlapping range between two adjacent scannings is from 8 mm to 10 mm. Hereunder, the position 8 mm is taken as an example for illustration. The center of the first scanning is 5 mm. Based on a conventional coordinate system where the coordinates on the left of the center are negative and the coordinates in the right of the center is positive, the coordinate distance from 8 mm to the center 5 mm is plus 3. The center of the second scanning is calculated to be 13 mm. The coordinate distance from 8 mm to the center 13 mm is minus 5, based on a same coordinate system. That is, a same scanning position may have a plus or minus coordinate distance relative to different scanning center, z in the equation (3) represents a coordinate distance. Therefore, based on two different values z of coordinate distance, two fields of view can be calculated. And the smaller field of view may be determined to perform scannings two times to construct images at the overlapping position.

S2, acquire two images at the overlapping position of two adjacent scannings based on the smaller field of view, the two images may include a first image fFirst(x,y,z) and a second image fSencond(x,y,z).

The first image may be reconstructed at the overlapping position in the first scanning, and the second image may be reconstructed at the overlapping position in the second scanning.

S3, set a transformational matrix T equal to a product of a translation, a rotational angle and a scale zoom factor, and predetermine an initial value of the transformational matrix.

Considering that images may translate, rotate or zoom in the three-dimensional space due to a patient's movement, a matrix including the three factors are therefore defined. In some embodiments, in order to obtain a satisfactory transformational matrix, an initial value of the transformational matrix may be predetermined to be a conjugate unit vector.

S4, perform, by using any one of the two images as a floating image and the other one as a reference image, a coordinate transformation on the floating image with the transformational matrix T.

For example, the first image is used as a reference image and the second image is used as a floating image. The transformational matrix T which has an initial value equal to a conjugate unit vector is used to perform transformation. If the second image after coordinate transformation is referred to as fSencond1, the translation of x axis, y axis and z axis is H(hx,hy,hz), the rotational angle is R($\alpha,\beta,\gamma$), the scale zoom factor is S(sx,sy,sz), the equation (4) may be expressed as follows.

$$fSencond1 = T(fSencond) = T = H(hx, hy, hz) * R(\alpha, \beta, \gamma) * S(sx, sy, sz),$$

$$\text{where } H(hx, hy, hz) = \begin{pmatrix} 1 & 0 & 0 & hx \\ 0 & 1 & 0 & hy \\ 0 & 0 & 1 & hz \\ 0 & 0 & 0 & 1 \end{pmatrix},$$

$$S(sx, sy, sz) = \begin{pmatrix} sx & 0 & 0 & 0 \\ 0 & sy & 0 & 0 \\ 0 & 0 & sz & 0 \\ 0 & 0 & 0 & 1 \end{pmatrix} \text{ and } R(\alpha, \beta, \gamma) = \begin{pmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{pmatrix} *$$

$$\begin{pmatrix} \cos\beta & 0 & \sin\beta & 0 \\ 0 & 1 & 0 & 0 \\ -\sin\beta & \cos\beta & 0 & 0 \\ 0 & 0 & 0 & 1 \end{pmatrix} * \begin{pmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{pmatrix}$$

S5, calculate the mutual information between the reference image and the image after coordinate transformation, and determine whether or not the mutual information reaches a threshold.

For example, if the second image after coordinate transformation in S4 is referred to as fSencond1, the mutual information between the image fSencond1 and the first image information is calculated.

Specifically, the mutual information may be calculated according to equation (5):

$$I(A, B) = \sum_{a,b} p_{AB}(a, b) \log \frac{p_{AB}(a, b)}{p_A(a) p_B(b)}$$

where A represents the first image information, B represents the second image information fSencond1 after coordinate transformation, $$p_{AB}(a, b) = \frac{h(a, b)}{\sum_{a \in, b \in B} h(a, b)}$$

represents a combined probability density, $$p_A(a) = \sum_{b \in B} p_{AB}(a, b) \text{ and } p_A(b) = \sum_{a \in B} p_{AB}(a, b)$$

represent marginal probability distribution, respectively, and h(a,b) is to calculate h(a,b) using a Area-ColorHistogram method, where h(a,b) represents the number of points which has a gray level of a in drawing A and has a gray level of b in drawing B.

S6, if not, modify the transformational matrix T using an optimizing search method, and perform a coordinate transformation on the floating image by using the modified transformational matrix T, and then go to the step of S5.

In some embodiments, in order to raise a search speed, the transformational matrix T may be modified with a Powell optimizing search method when the mutual information does not reach the threshold. The Powell optimizing search method is a direct and efficient conjugate direction method, in which the whole calculation includes a plurality of iterations, and each iteration is composed of n times of one dimension search. For an iteration of the method, a best point is first obtained by successively searching along n directions which are already known. The iteration result is calculated by performing searching along a direction from an initial point to the best point. Then the first search direction is replaced with the last search direction to perform a next iteration. As for the order of search, a rotational angle and a scale zoom factor may be searched first, afterwards, a translation is searched, so as to modify the transformational matrix T.

Then, a coordinate transformation is performed on the floating image using the modified transformational matrix T by repeating the steps of S5 and S6, until the mutual information reaches the threshold.

S103, acquire a corresponding transformational matrix when the mutual information reaches a threshold, and compensate an image which needs to be compensated using the transformational matrix.

When the mutual information is determined to reach the threshold, a corresponding transformational matrix is acquired which is then used to compensate the floating image.

Because the first image serves as the reference image, the second image serving as the floating image needs to be compensated.

According to the first embodiment, an image compensation method may be implemented by calculating an overlapping position between two adjacent scannings; obtaining two images at the overlapping position of the two adjacent scannings, and calculating mutual information of the two images using a three dimensional non-rigid registration method; and acquiring a corresponding transformational matrix when the mutual information reaches a threshold, and compensate an image which needs to be compensated using the transformational matrix. Because some z positions are overlapped between the two adjacent scannings, the image at the z position is not a complete image, which however can be used to find a motion law at the z position of the two adjacent scannings and to obtain a corresponding match factor. The match factor can be used to compensate for the image at different scannings, so as to obtain an image having a same motion state matching with the previous scanning. The physiological structure of an object under scanning may be varied in different scannings due to the object's motion, a three dimensional non-rigid registration method is used in the present disclosure to perform transformation, so as to achieve consistence of images at the z position. In conclusion, the method provided in embodiments of the present disclosure can solve the problems of inconsistence of images generated in different scannings caused by a patient's movement, which thus affects images' continuity and further adversely influences medical diagnosis.

Embodiment Two

Figure 4:
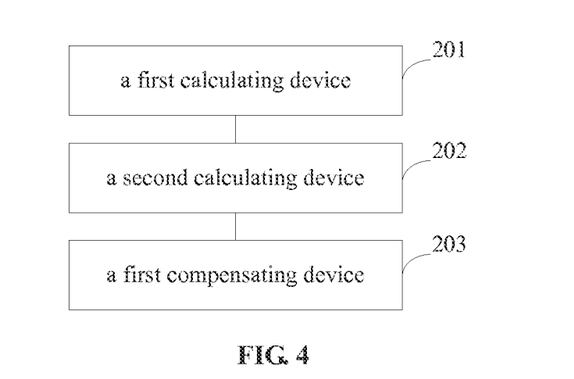
FIG. 4 schematically illustrates a structural diagram of an image compensation apparatus according to a second embodiment of the present disclosure.

Corresponding to the image compensation method provided above, an image compensation apparatus is provide. Referring to FIG. 4. FIG. 4 schematically illustrates a structural diagram of an image compensation apparatus according to the second embodiment of the present disclosure. The apparatus includes a first calculating device 201, a second calculating device 202 and a first compensating device 203. Hereinafter, an internal structure and a connection relationship of the apparatus will be described in detail in accompanying with its operation principle.

The first calculating device 201 is configured to calculate an overlapping position between two adjacent scannings.

The second calculating device 202 is configured to obtain two images at the overlapping position of the two adjacent scannings, and calculate mutual information of the two images using a three dimensional non-rigid registration method.

The first compensating device 203 is configured to acquire a corresponding transformational matrix when the mutual information reaches a threshold, and compensate an image which needs to be compensated using the transformational matrix.

Figure 5:
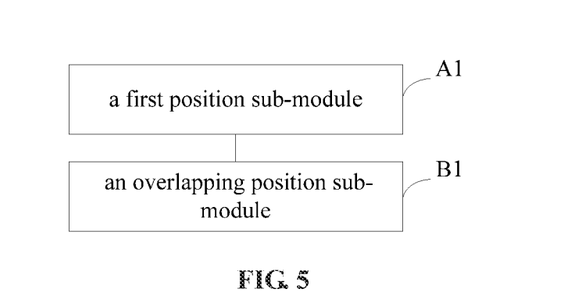
FIG. 5 schematically illustrates a structural diagram of a device for calculating an overlapping position according to the second embodiment of the present disclosure.

FIG. 5 schematically illustrates a structural diagram of a device for calculating an overlapping position according to the second embodiment of the present disclosure. Referring to FIG. 5, the first calculating device includes a first position sub-module A1 and an overlapping position sub-module B1.

The first position sub-module A1 is configured to calculate a position range for reconstructing a complete image using the center of the first scanning as a symmetry point.

In some embodiments, the first position sub-module A1 is configured to calculate a position range for reconstructing a complete image using the center of the first scanning as a symmetry point according to the equation (1)

$$ZValid = \frac{D - FOV}{D} * (M - 1) * 0.5 * S.$$

In the equation (1), M represents a slice number of a detector, S represents a width of each slice, D represents a distance between a focus and a rotating center, and FOV represents field of view for image reconstruction.

The overlapping position sub-module B1 is configured to calculate an overlapping range between the two adjacent scannings according to the position range for reconstructing a complete image.

In some embodiments, the overlapping position sub-module B1 is configured to calculate an overlapping range between the two adjacent scannings according to the equation (2) ZOverlap=(M−1)*S*0.5−ZValid+a, by using a center of the two adjacent scannings as a symmetry point, or, according to a relationship between the overlapping range and the first scanning position, where a represents an expanded overlapping width which is predetermined and equals to or greater than 0.

In the equation (2), M represents a slice number of a detector, S represents a width of each slice, ZValid represents a position range which can be used to reconstruct a complete image by using a scanning center as a symmetry point.

Figure 6:
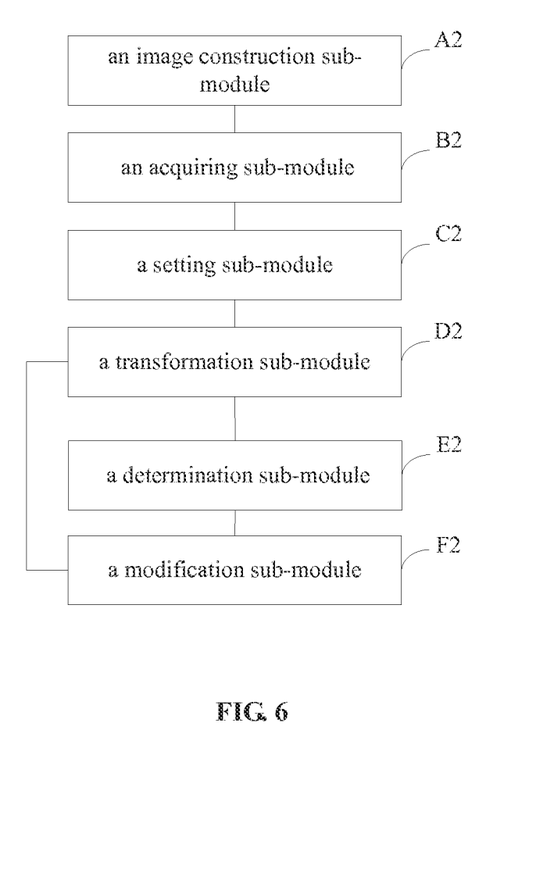
FIG. 6 schematically illustrates a structural diagram of a device for calculating mutual information according to the second embodiment of the present disclosure.

FIG. 6 schematically illustrates a structural diagram of a device for calculating mutual information according to the second embodiment of the present disclosure. Referring to FIG. 6, the second calculating device 202 includes an image construction sub-module A2, an acquiring sub-module B2, a setting sub-module C2. a transformation sub-module D2, a determination sub-module E2, and a modification sub-module F2.

The image construction sub-module A2 is configured to calculate reconstruction fields of view at the overlapping position of the two neighboring scannings and select the smaller one, and perform scannings two times to construct images at the overlapping position, where z represents a coordinate distance between a scanning position and a scanning center.

In some embodiments, the image construction sub-module A2 execute its functions according to the equation (3), $$FOV(z) = \left(1 - \frac{z}{0.5 * (M - 1) * S}\right) * D * 2.$$

In the equation (3), M represents a slice number of a detector, S represents a width of each slice, D represents a distance between a focus and a rotating center, and z represents a coordinate distance between a scanning position and a scanning center.

The acquiring sub-module B2 is configured to acquire two images at the overlapping position of the two adjacent scannings, the two images may include a first image fFirst(x,y,z) and a second image fSencond(x,y,z).

The setting sub-module C2 is configured to set a transformational matrix T equal to a product of a translation, a rotational angle and a scale zoom factor, and predetermine an initial value of the transformational matrix.

The transformation sub-module D2 is configured to perform, by using any one of the two images as a floating image and the other image as a reference image, a coordinate transformation on the floating image with the transformational matrix T.

The determination sub-module E2 is configured to calculate mutual information between the reference image and the image after coordinate transformation, and determine whether or not the mutual information reaches a threshold.

The modification sub-module F2 is configured to modify the transformational matrix T using an optimizing search method, wherein the modified transformational matrix T is sent to the transformation sub-module D2 to perform a coordinate transformation on a floating image with the modified transformational matrix T.

In some embodiments, in order to raise a search speed, the modification sub-module F2 may be configured to modify the transformational matrix T with a Powell optimizing search method.

In some embodiments, the setting sub-module C2 may be configured to predetermine an initial value of the transformational matrix to be a conjugate unit vector.

In some embodiments, the second calculating device may further include a preprocess sub-module configured to perform denoising and/or sampling on the floating image before the transformation sub-module D2 performs a coordinate transformation on the floating image; and an interpolation sub-module configured to, after the transformation sub-module D2 performs a coordinate transformation on the floating image, perform an interpolation process on the transformed image.

The determination sub-module may be configured to calculate the mutual information between the reference image and the image after being interpolated, and determine whether or not the mutual information reaches a threshold.

According to the first embodiment, an image compensation apparatus may execute its functions by calculating an overlapping position between two adjacent scannings; obtaining two images at the overlapping position of the two adjacent scannings, and calculating mutual information of the two images using a three dimensional non-rigid registration method; and acquiring a corresponding transformational matrix when the mutual information reaches a threshold, and compensate an image which needs to be compensated using the transformational matrix. Because some z positions are overlapped between two adjacent scannings, the image at the z position is not a complete image, which however can be used to find a motion law in adjacent scannings and obtain a corresponding match factor. The match factor can be used to compensate for the image at different two times scans, so as to obtain an image having a same motion state matching with the previous scanning. The physiological structure of an object under scanning may be varied in different scanning process due to the object's motion, a three dimensional non-rigid registration method is used in the present disclosure to perform transformation, so as to achieve consistence of images at the z position. In conclusion, the apparatus provided in embodiments of the present disclosure can solve the problems of inconsistence of images generated in different scanning processes caused by a patient's movement, which thus affects images' continuity and further adversely influences medical diagnosis.

It should be noted that the modules of the apparatus described in embodiments of the present disclosure may be individual or be integrated into a CT apparatus.

It should be noted that, the terms "first", "second", and the like in the description and in the claims, are used for distinguishing between similar elements and not tend to describe a particular sequential and chronological order. Furthermore, the terms "comprise". "include" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. Similarly, the term "include a" or "comprise a" is not necessarily limited that a process, method, article, or apparatus may include an element, but may further include other similar elements.

It will be apparent to those skilled in the art that some or all of the procedures of such methods provided in embodiments of the present disclosure may be performed by related hardware in response to some computer programs. The computer programs may be stored in a computer-readable storage medium, which may execute the processes of the methods described in the above embodiments. The storage medium may be an optical disk, a magnetic disk, a Read-Only Memory (ROM), or a Random Access Memory (RAM), etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

We claim:

1. An image compensation method, comprising:
    calculating a position range for reconstructing a complete image by using a center of a first scanning as a symmetry point;
    calculating an overlapping position between two adjacent scannings according to the position range for reconstructing the complete image;
    obtaining two images at the overlapping position of the two adjacent scannings, and calculating mutual information of the two images by using a three dimensional non-rigid registration method; and
    acquiring a corresponding transformational matrix when the mutual information reaches a threshold, and compensating one of the two images which needs to be compensated by using the transformational matrix.

2. The method according to claim 1, wherein the step of obtaining two images at the overlapping position of the two adjacent scannings, and calculating mutual information of the two images by using a three dimensional non-rigid registration method comprises:
    S1, calculating reconstruction fields of view at the overlapping position of the two neighboring scannings and selecting the smaller one;
    S2, acquiring two images including a first image and a second image at the overlapping position of the two adjacent scannings according to the smaller reconstruction fields of view;
    S3, setting a transformational matrix T equal to a product of a translation, a rotational angle and a scale zoom factor, and predetermining an initial value of the transformational matrix;
    S4, performing, by using any one of the two images as a floating image and the other one as a reference image, a coordinate transformation on the floating image with the transformational matrix T;
    S5, calculating the mutual information between the reference image and the image after coordinate transformation, and determining whether or not the mutual information reaches a threshold; and
    S6, if not, modifying the transformational matrix T using an optimizing search method, and performing a coordinate transformation on the floating image by using the modified transformational matrix T, and then the method going to the step of S5.

3. The method according to claim 2, wherein the transformational matrix T is modified with a Powell optimizing search method when the mutual information does not reach the threshold.

4. The method according to claim 2, wherein an initial value of the transformational matrix is predetermined to be a conjugate unit vector.

5. The method according to claim 2, further comprising: performing denoising and/or sampling on the floating image before performing a coordinate transformation on the floating image with the transformation matrix T.

6. The method according to claim 2, after performing a coordinate transformation on the floating image with the transformation matrix T, the method further comprises: performing an interpolation process on the transformed image, wherein S5 comprises: calculating the mutual information between the reference image and the image after being interpolated, and determining whether or not the mutual information reaches a threshold.

7. An image compensation apparatus, comprising:
   a first calculating device, configured to calculate an overlapping position between two adjacent scannings, wherein the first calculating device comprises: a first position sub-module, configured to calculate a position range for reconstructing a complete image by using a center of a first scanning as a symmetry point and an overlapping position sub-module, configured to calculate the overlapping position between the two adjacent scannings according to the position range for reconstructing a complete image;
   a second calculating device, configured to obtain two images at the overlapping position of the two adjacent scannings, and calculate mutual information of the two images by using a three dimensional non-rigid registration method; and
   a first compensating device, configured to acquire a corresponding transformational matrix when the mutual information reaches a threshold, and compensate one of the two images which needs to be compensated by using the transformational matrix.

8. The apparatus according to claim 7, wherein the second calculating device comprises:
   an image construction sub-module, configured to calculate reconstruction fields of view at the overlapping position of the two neighboring scannings and select the smaller one;
   an acquiring sub-module, configured to acquire the two images including a first image and a second image at the overlapping position of the two adjacent scannings based on the smaller reconstruction fields of view;
   an setting sub-module, configured to set a transformational matrix T equal to a product of a translation, a rotational angle and a scale zoom factor, and predetermine an initial value of the transformational matrix;
   an transformation sub-module, configured to perform, by using any one of the two images as a floating image and the other image as a reference image, a coordinate transformation on the floating image with the transformational matrix T;
   a determination sub-module, configured to calculate mutual information between the reference image and the image after coordinate transformation, and determine whether or not the mutual information reaches a threshold; and
   a modification sub-module, configured to modify the transformational matrix T by using an optimizing search method, wherein the modified transformational matrix T is sent to the transformation sub-module to perform a coordinate transformation on a floating image with the modified transformational matrix T.

9. The apparatus according to claim 8, wherein the modification sub-module is configured to modify the transformational matrix T with a Powell optimizing search method.

10. The apparatus according to claim 8, wherein the setting sub-module is configured to predetermine an initial value of the transformational matrix to be a conjugate unit vector.

11. The apparatus according to claim 8, wherein the second calculating device further comprises a preprocess sub-module configured to perform denoising and/or sampling on the floating image before the transformation sub-module performs a coordinate transformation on the floating image.

12. The apparatus according to claim 8, wherein the second calculating device further comprises an interpolation sub-module configured to, after the transformation sub-module performs a coordinate transformation on the floating image, perform an interpolation process on the transformed image, wherein the determination sub-module is configured to the calculate mutual information between the reference image and the image after being interpolated, and determine whether or not the mutual information reaches a threshold.

* * * * *